(12) United States Patent
Held et al.

(10) Patent No.: US 7,420,504 B1
(45) Date of Patent: Sep. 2, 2008

(54) METHOD OF OPERATING A MULTIBEAM RADAR

(75) Inventors: Daniel N. Held, Severna Park, MD (US); Elbert L. Cole, Jr., Catonsville, MD (US); Martin J. Decker, Baltimore, MD (US); Charles Y. Chen, Odenton, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 35 days.

(21) Appl. No.: 11/326,383

(22) Filed: Jan. 6, 2006

Related U.S. Application Data

(60) Provisional application No. 60/673,755, filed on Apr. 22, 2005.

(51) Int. Cl.
G01S 13/89 (2006.01)
G01S 13/12 (2006.01)
G01S 13/90 (2006.01)
G01S 13/00 (2006.01)

(52) U.S. Cl. .................. 342/137; 342/25 R; 342/25 A; 342/134; 342/135; 342/165; 342/173; 342/175; 342/176; 342/179; 342/195

(58) Field of Classification Search ...... 342/25 R–25 F, 342/118, 134–144, 175, 192–197, 159–165, 342/173–174, 176, 179, 190, 191, 89, 94–97, 342/59, 82, 128, 130, 131, 132
See application file for complete search history.

(56) References Cited

U.S. PATENT DOCUMENTS 4,355,311 A * 10/1982 Frosch et al. ............. 342/25 A
4,706,088 A * 11/1987 Weindling ................ 342/25 A
4,724,418 A * 2/1988 Weindling ................ 342/25 A
4,912,685 A * 3/1990 Gilmour .................. 342/25 A
5,051,749 A * 9/1991 Stoyle ..................... 342/25 A
5,323,162 A * 6/1994 Fujisaka et al. ........... 342/25 B
5,745,069 A * 4/1998 Gail ........................ 342/25 F
6,714,157 B2    3/2004 Wittenberg
6,888,490 B1 * 5/2005 Brovko et al. ............ 342/25 A
7,196,653 B2 * 3/2007 Hall et al. ................ 342/25 F

FOREIGN PATENT DOCUMENTS

JP      6-118166 A  *  4/1994

* cited by examiner

*Primary Examiner*—Bernarr E Gregory
(74) *Attorney, Agent, or Firm*—Andrews Kurth LLP

(57) ABSTRACT

A method of operating a multibeam radar carried on a platform flying a mission over a prescribed flight path to obtain images of a plurality of target areas, the beams of said radar being the result of respective transmit pulses and beam returns being received by respective receive windows. A range of pulse repetition frequencies and pulse repetition frequency change rates are used in an iterative process to determine non-collision alignments of any combination of transmit pulses and receive windows. When a non-collision alignment is determined the particular arrangement producing that non-collision alignment is used in a simulated flight of the platform to determine dwell time before a collision occurs. An arrangement that produces sufficient dwell time to accomplish a mission is then used in an actual flight of the platform.

23 Claims, 10 Drawing Sheets

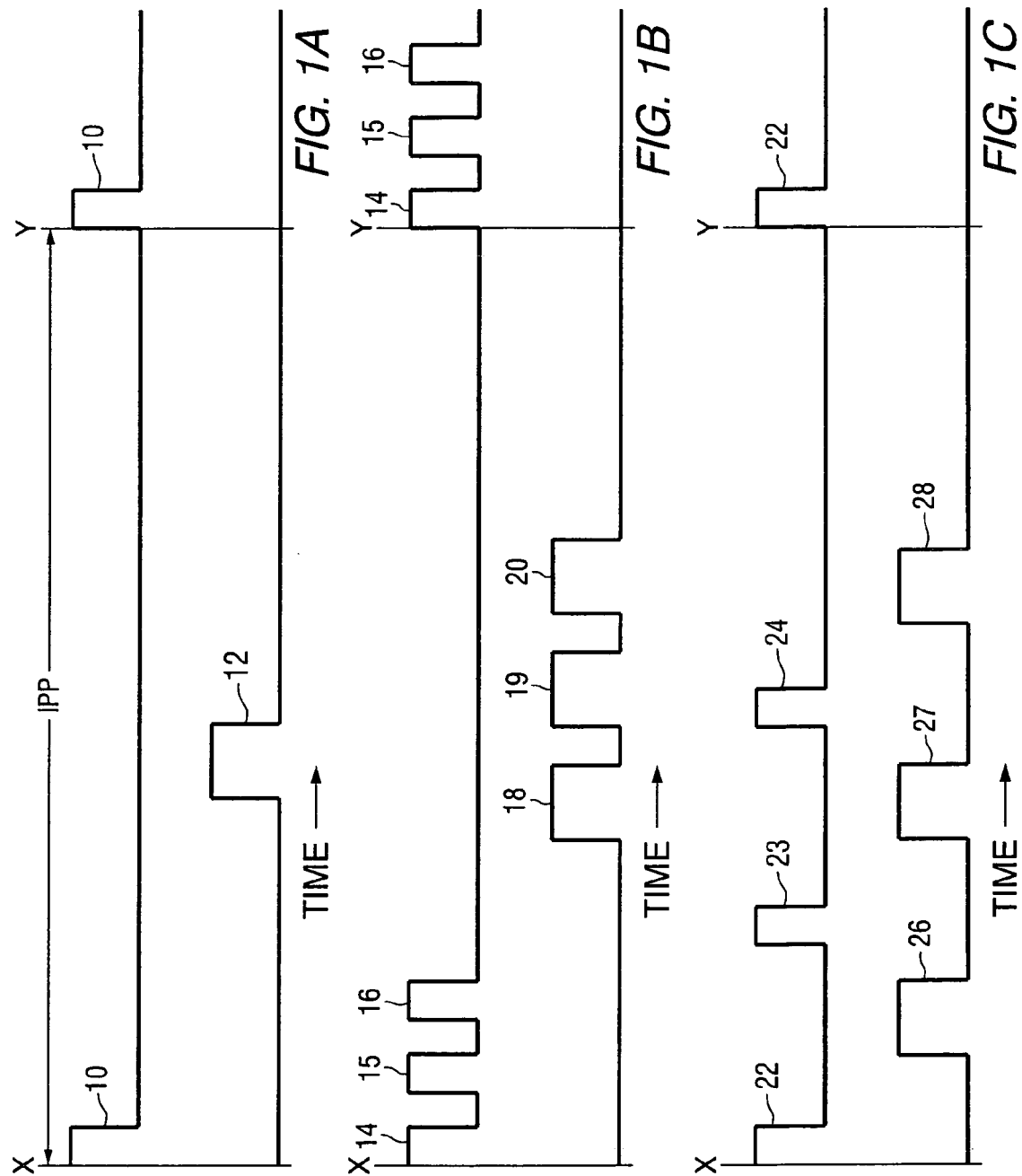

METHOD OF OPERATING A MULTIBEAM RADAR

CROSS-REFERENCE TO RELATED APPLICATION

The present application claims the benefit of priority of U.S. provisional patent application Ser. No. 60/673,755 filed on Apr. 22, 2005, which is hereby expressly incorporated by reference.

BACKGROUND OF THE INVENTION

1. Field of the Invention

The invention in general relates to multibeam radars and more particularly to an active electronically scanned array multibeam radar which is particularly well adapted to obtain high resolution radar images.

2. Description of Related Art

In an active electronically scanned array multibeam radar, with a single aperture, i.e. an antenna, various modes of operation may be accomplished including a synthetic aperture radar (SAR) mode as well as a surface or ground moving target indicator (MTI) mode. The antenna is comprised of a multitude of individual antenna elements each of which has its own phasing arrangement so as to allow for electronic steering of the beams.

Basically, the beam width produced by the antenna defines the azimuth resolution that may be obtained; the beam width is proportional to the antenna length. For obtaining a high resolution target image this requires an antenna physically longer than can be carried by an airborne platform such as an aircraft or satellite. In a SAR mode, multiple radar returns are collected as the platform flies a predetermined course. The returns are combined and processed as though they came from a physically long antenna (synthetic aperture) yielding a finer resolution than is possible from a smaller antenna.

In one type of SAR, known as a spotlight SAR, as the platform flies its prescribed course, multiple transmissions are steered toward the same target area, from which multiple returns are collected and processed. The processing results in a target image which is of photographic quality.

The MTI mode is somewhat similar in that multiple transmissions are directed toward a target area, although less such transmissions are made compared to the SAR mode, to achieve a result. In the MTI mode Doppler returns are processed which depict moving targets within the target area.

In operation, multiple transmit pulses, one for each beam, are generated in a single interpulse period (IPP) and returns are detected within respective receive windows. For aircraft borne radars these receive windows may be in the same IPP as the transmit pulses, or for a spaceborne application the receive windows will be in a subsequent IPP as a function of the target range.

During such operation, it is imperative to avoid any collisions, where a collision is defined as the simultaneous time occurrence of any combination of transmit pulses and receive windows. Any such collisions during the dwell time that the beams are directed toward the target area will prevent obtaining of the desired target image.

Accordingly, the present invention has for an object a procedure for determining if a certain pulse repetition frequency (PRF), PRF change rate, and a certain alignment of transmit pulses and receive windows will allow sufficient dwell time to accomplish the collection of multiple images within the collection time of a single image.

SUMMARY OF THE INVENTION

The present invention is directed to a method of operating a multibeam radar carried on a platform flying a mission over a prescribed flight path to obtain images of a plurality of target areas, the beams of the radar being the result of respective transmit pulses and beam returns being received by respective receive windows. A plurality of data relating to the mission and the radar is provided and from this data, a plurality of parameters related to the geometry of the flight of the platform as well as the operation of the radar is calculated, including the calculation of a range of PRFs and PRF change rates to be utilized in an iterative process. The iterative process is performed to determine a non-collision alignment of the transmit pulses and the receive windows. The PRFs, PRF change rates and the non-collision alignment are used to simulate a flight of the platform over the prescribed flight path to determine, for such alignment the dwell time until a collision occurs. After this determination the PRF, PRF change rate and the non-collision alignment which provided sufficient dwell time to obtain all target images are used in the actual flight of the platform.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein:

FIGS. 1A, 1B and 1C are radar timing diagrams.

DESCRIPTION OF THE PREFERRED EMBODIMENT

Figure 2A:
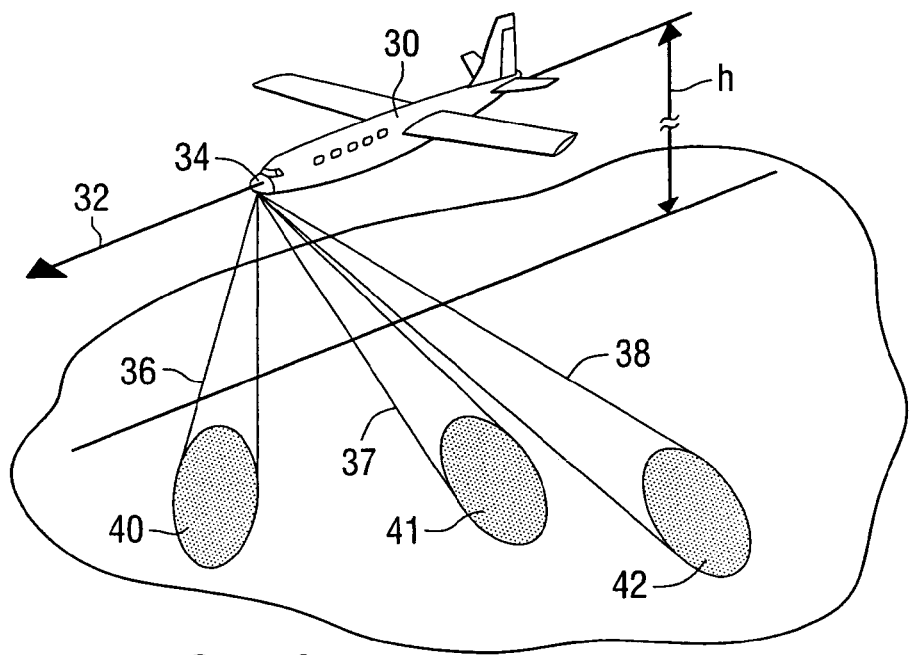
FIGS. 2A and 2B illustrate two forms of radar-carrying platforms.

In FIG. 1A, the interval between lines X and Y represents one inter-pulse period (IPP) for a single beam radar. A transmit pulse 10 at the beginning of the IPP causes a single beam of energy to irradiate a target area on the surface of the earth, from which a return signal is received at the time of receive window 12. Conversely, in a multibeam radar the same IPP is used to generate and receive a plurality of beams, such as illustrated in FIG. 1B. In FIG. 1B three transmit pulses 14, 15 and 16, by way of example, transmit three substantially simultaneous beams while receive windows 18, 19 and 20 receive return signals.

For relatively close target area ranges, for example less than 100 miles, receive windows 18, 19 and 20 receive the return signals resulting from transmit pulses 14, 15 and 16 in the same IPP. For more distant target areas, such as encountered in satellite borne radars, where distances may be hundreds or thousands of miles to the target areas, returns at receive windows 18, 19 and 20 would result from a previous IPP transmission.

In FIG. 1C, as opposed to the arrangement of FIG. 1B, each transmission occurs prior to reception of a respective return signal. FIG. 1C illustrates a mode of operation wherein a first transmit pulse 22 is followed by a first receive window 26, a second transmit pulse 23 is followed by a second receive window 27 and a third transmit pulse 24 is followed by a third receive window 28, all within the same IPP.

Figure 2B:
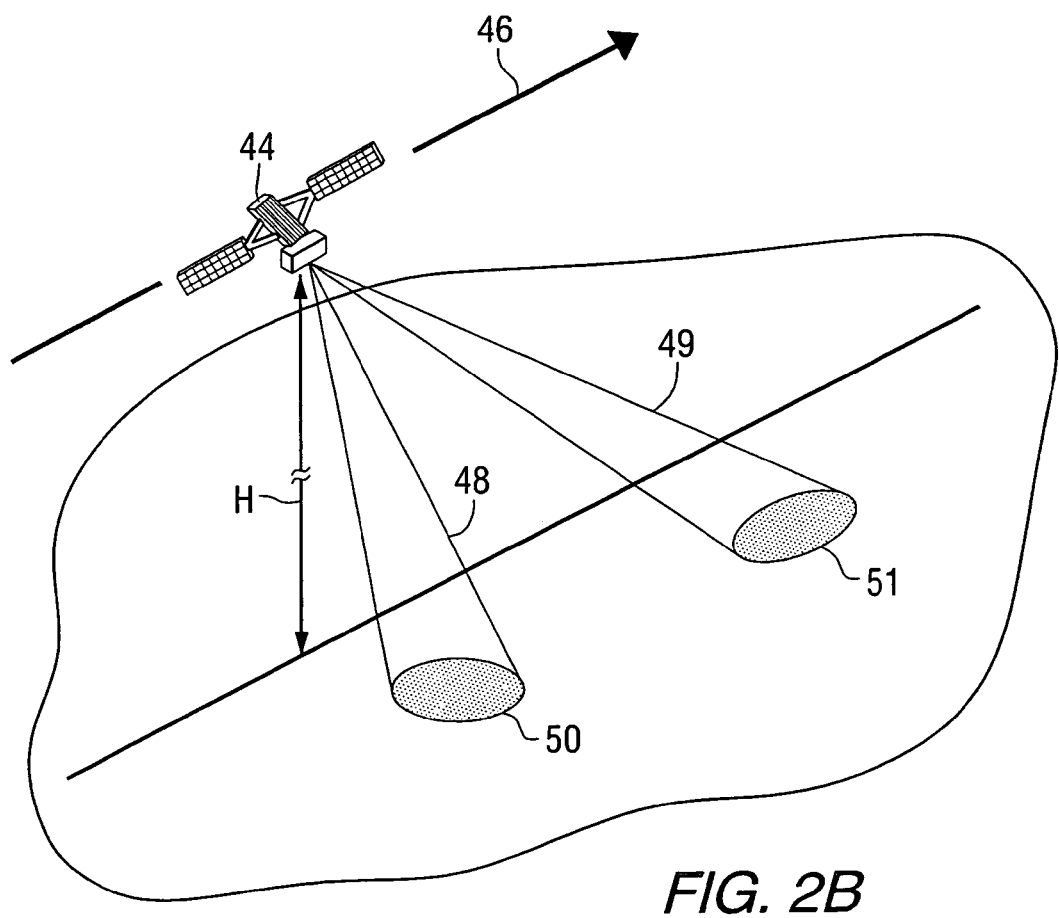

FIGS. 2A and 2B illustrate two types of platforms for carrying the multibeam radar. FIG. 2A illustrates an aircraft 30 flying along a prescribed flight path 32 at an altitude of h. The radar, carried in nose portion 34 of the aircraft 30 produces, by way of example, three beams 36, 37 and 38 which irradiate respective target areas 40, 41 and 42. In FIG. 2B, the radar is carried by a satellite 44 traveling along flight path 46 at a significantly higher altitude H. Two beams 48 and 49 are produced, by way of example, which irradiate respective target areas 50 and 51. In both of these examples the radars may be operated in an all SAR mode producing all SAR beams, in an all MTI mode producing all MTI beams or a combination of SAR and MTI modes.

For other than directly under the platform, the target areas will essentially be elliptical in shape. For example, in FIG. 3 the dotted ellipse 54 represents the −3 dB power points, i.e., the half power points, of the energy on the target area. In the present invention, in order to avoid certain ambiguities, returns are obtained from the 20 dB points as represented by solid ellipse 55. The range direction (along the major axis of the ellipse) is from point A to point B while the azimuth direction (along the minor axis of the ellipse) is from point C to point D. The center of the target area, to which range measurements are made, is indicated by point 56.

Figure 3:
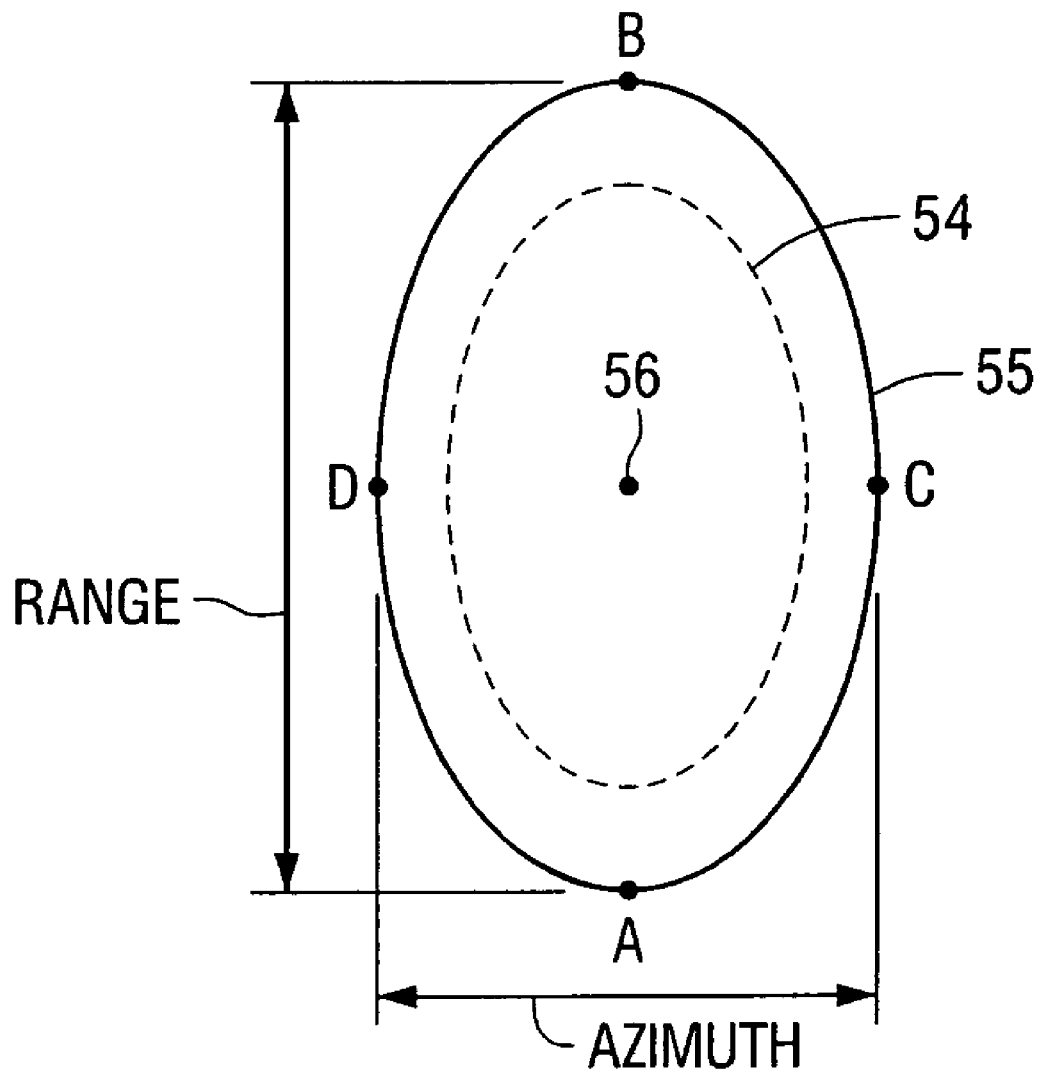
FIG. 3 illustrates a target area irradiated by a radar beam.

The time associated with the value of RANGE (the major axis of the ellipse) in FIG. 3 is given by:

$$TIME = C/2 \times RANGE$$

where C is the speed of light. The value of TIME is the time it takes to irradiate and receive the reflected energy from the RANGE extent. The rate at which the transmitter is pulsed is limited by 1/TIME Hz. Since the energy from the prior transmitted pulse will be received in the current pulse, this would be an ambiguity in range since it occurs from a previous time interval. The −20 dB points on the beam pattern are selected where the energy level has dropped to $\frac{1}{100}^{th}$ of that of the peak of the beam. Thus any energy outside of this limit will be ambiguous but it is sufficiently small as not to be a problem.

The minor axis of the ellipse in FIG. 3 represents the cross range, or azimuth dimension. The motion of the platform carrying the radar creates a Doppler shift, $F_d$ according to the relation:

$$F_d = 2 \times (V/\lambda) \times \cos \alpha$$

Where V is the velocity of the platform, λ is the wavelength of the signal and α is the angle from the platform path, e.g., numeral 46 in FIG. 2B, to the center of the irradiated area i.e., point 56 of FIG. 3, at which the Doppler frequency $F_d$ exists.

The minor axis causes the cross-range edges of the beam to have slightly different angles than the center and thus have a slightly different Doppler frequency; one edge will be greater and the other edge will be less than the center frequency. The Doppler frequency difference is:

$$\Delta F_d = 2 \times B \times V / \lambda$$

where B is the beamwidth, V is the platform velocity and λ is the signal wavelength.

The value of $\Delta F_d$ sets the minimum transmission rate (PRF) which is equal to $\Delta F_d$. The beamwidth term is set equal to the cross range −20 dB point. If the transmission PRF drops below the indicated value, then the cross-range Doppler frequencies that are sampled would be less than the minor axis Doppler frequency and the Doppler frequency would be aliased. Therefore the minimum PRF is set by cross-range Doppler alias effects and the maximum PRF is set by the range alias effects.

Figure 4:
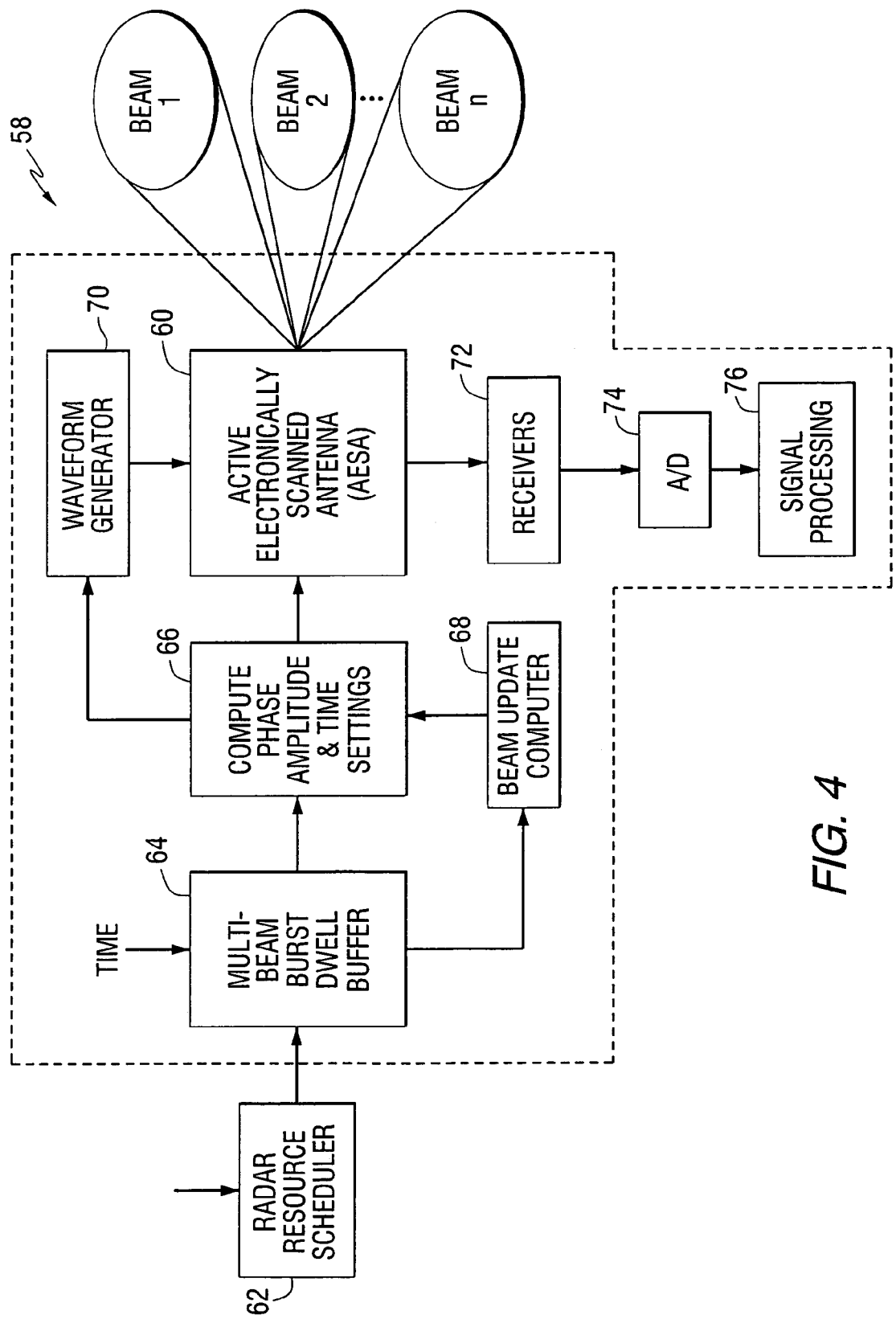
FIG. 4 is a block diagram of a multibeam radar system.

The procedure of the present invention may be accomplished with a variety of well known radar systems, one example of which is illustrated in FIG. 4. The multibeam radar 58 includes an electronically steerable antenna 60 which produces and receives a plurality of beams labeled as beam 1 to beam n.

Operation of the radar 58 is accomplished with a plurality of radar modules including a radar resource scheduler 62, a multibeam burst dwell buffer 64, a module 66 for computing phase amplitude and time settings, a beam update computer 68, a waveform generator 70, a receiver module 72, an analog to digital converter 74 and a signal processor 76.

The radar resource scheduler 62 is a computer to which is input certain data, to be subsequently described, and is operable, in response to the data, and certain operations performed on the data, to prioritize a collection schedule. The procedure in accordance with the present invention may be implemented by a computer program resident in the radar resource scheduler 62. The radar resource scheduler 62 operates interactively with the program to determine which collection tasks can be accomplished in parallel using multiple beams, one for each task. The final collection schedule is converted to radar specific instructions and sent to the multibeam burst dwell buffer 64 for execution.

The multibeam burst dwell buffer 64 allows time related radar operation tasks to be conducted with a minimum of delay. A multibeam collect requires the radar instructions to be instantaneously available for all beams. At the designated time as defined by the radar resource scheduler 62, the multibeam burst dwell buffer 64 provides radar instructions to the real time components of the radar system. The output of the multibeam burst dwell buffer 64 is the real time pointing and radiate control schedule which includes PRF, PRF change rate, and the relationships of the transmit and receive timing.

The radar beam pointing is accomplished electronically by using phase control of the signal radiated from each antenna element of the antenna array 60 The pointing angles in the radar instruction set are converted to phase settings for each antenna element by the module 66 which is also operative to adjust amplitude settings. Further, if tapering of the antenna response is desired, then module 66 is operative to adjust amplitude settings as well.

A beam update computer 68, receiving instructions from the multibeam burst dwell buffer 64, controls the beam angles. That is, as the platform flies along its prescribed flight path, the angle of the beams are changed by the beam update computer 68 at a rate which is proportional to platform velocity so as to keep the beams pointed at their respective target areas.

Waveform generator 70 produces each pulse to be radiated by the antenna 60. The time width of the pulse is set and the modulation of the radiated frequency is established each transmit interval. In addition, any antenna time delay required is provided to avoid certain undesirable sidelobes while steering the beams.

Receiver 72 processes the radar returns and down converts them to a lower frequency for processing. The received returns will normally be converted to a digital format in analog to digital converter 74 prior to processing by signal processor 76. Some or all of the data processing necessary to obtain a target image may be done onboard the platform or may be transmitted to the user at a distant location.

The antenna 60 consists of a two dimensional array of antenna elements each fed by a transmit amplifier and connected to a low noise amplifier. Each element has a phase shifter and attenuator that are used to control the phase (pointing) and the amplitude (taper) of the transmitted and receive signal. The two dimensional aggregation of the transmit/receive elements provides the radiated power level, the transmit gain and the receive gain.

Figure 5A:
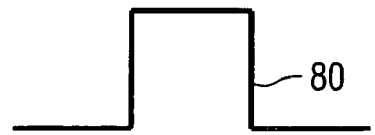
FIGS. 5A to 5E relate to a chirp waveform.
Figure 5B:
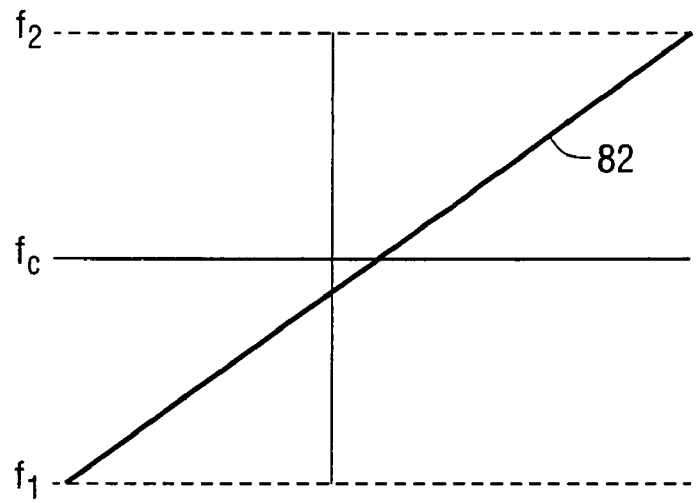

FIG. 5A illustrates a typical transmit pulse 80. Pulse 80 is actually the envelope of a sine wave of a particular frequency. For a higher bandwidth, and accordingly a higher resolution, it is preferred to employ a linear FM waveform, also known as a chirp, illustrated in FIG. 5B. Line 82 indicates the increase in frequency from $f_1$ to $f_2$ over a predetermined time period. The center frequency of the chirp is designated $f_c$.

Figure 5C:
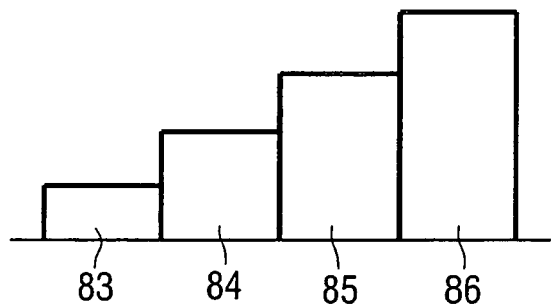
Figure 5D:
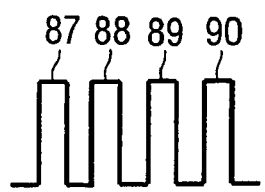
Figure 5E:
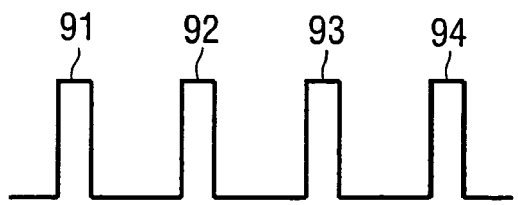

The same result of a linear chirp may be accomplished by using a step chirp. A step chirp breaks up a long chirp into chirp segments. For example, if a single chirp is 100 MHz, ten step chirp pulses would be implemented with a chirp of 10 MHz in each pulse. Each of the pulses would be offset in 10 MHz steps so that the 10 MHz chirps would recreate the 100 MHz chirp. FIG. 5C illustrates, by way of example, a series of constant frequency steps 83 to 86. Each step 83 to 86 is of an increasing frequency thus closely simulating the linear increase indicated in FIG. 5B. The steps may be generated so that they are fairly close to one another, as in FIG. 5D, and indicated by pulses 87 to 90, or they may be spaced apart, as indicated by pulses 91 to 94 in FIG. 5E.

Figure 6A:
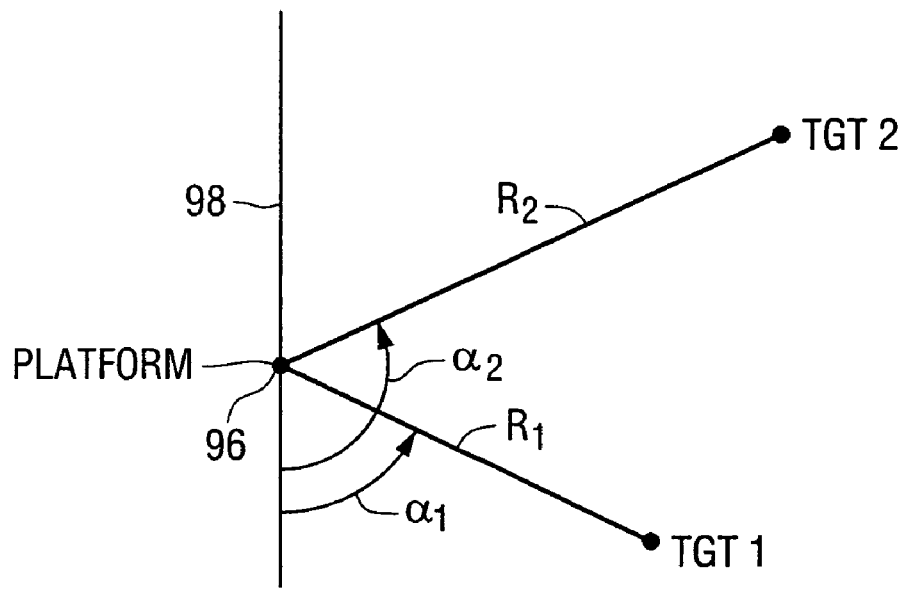
FIGS. 6A and 6B serve to illustrate a problem in operating a multibeam radar.
Figure 6B:
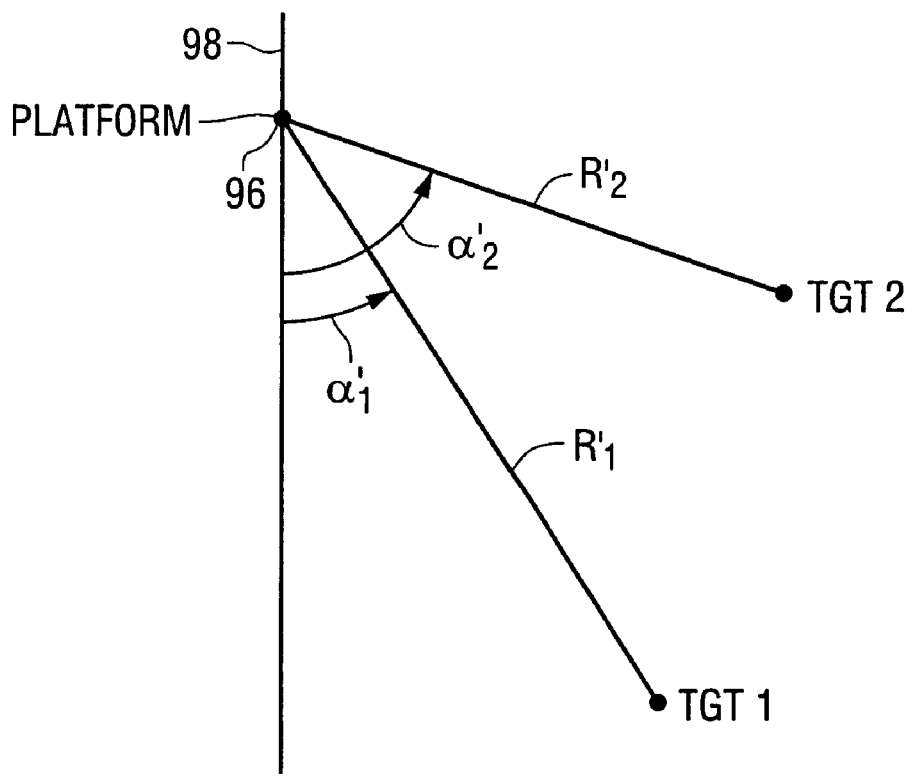

FIGS. 6A and 6B illustrate a problem involved in operating in a multibeam SAR and/or MTI mode. Two beams are illustrated by way of example. If, hypothetically, the two target areas imaged by the beams were on either side of the platform flight path and equally distant to the platform, then a PRF and PRF change rate change may, from geometric considerations, be easily obtained.

In most instances, however, this will not be the case. For example, FIG. 6A illustrates a platform 96 which travels along a prescribed flight path 98. The distance to target 1 is $R_1$ at an angle $\alpha_1$ and the distance to target 2 is $R_2$, at an angle $\alpha_2$, where $R_2 > R_1$. During travel along the flight path 98 these distances and angles dynamically change such as seen at a later point in time in FIG. 6B. In FIG. 6B target 1 is now at a distance $R'_1$ at angle $\alpha'_1$ while target 2 is at a distance $R'_2$ at angle $\alpha'_2$, where now $R'_1 > R'_2$. Therefore, due to the differential range changes with time, dR/dt, (as well as acceleration change) a compromise PRF and PRF change rate must be selected which is compatible for both beams so to accomplish imaging from both targets.

Figure 7:
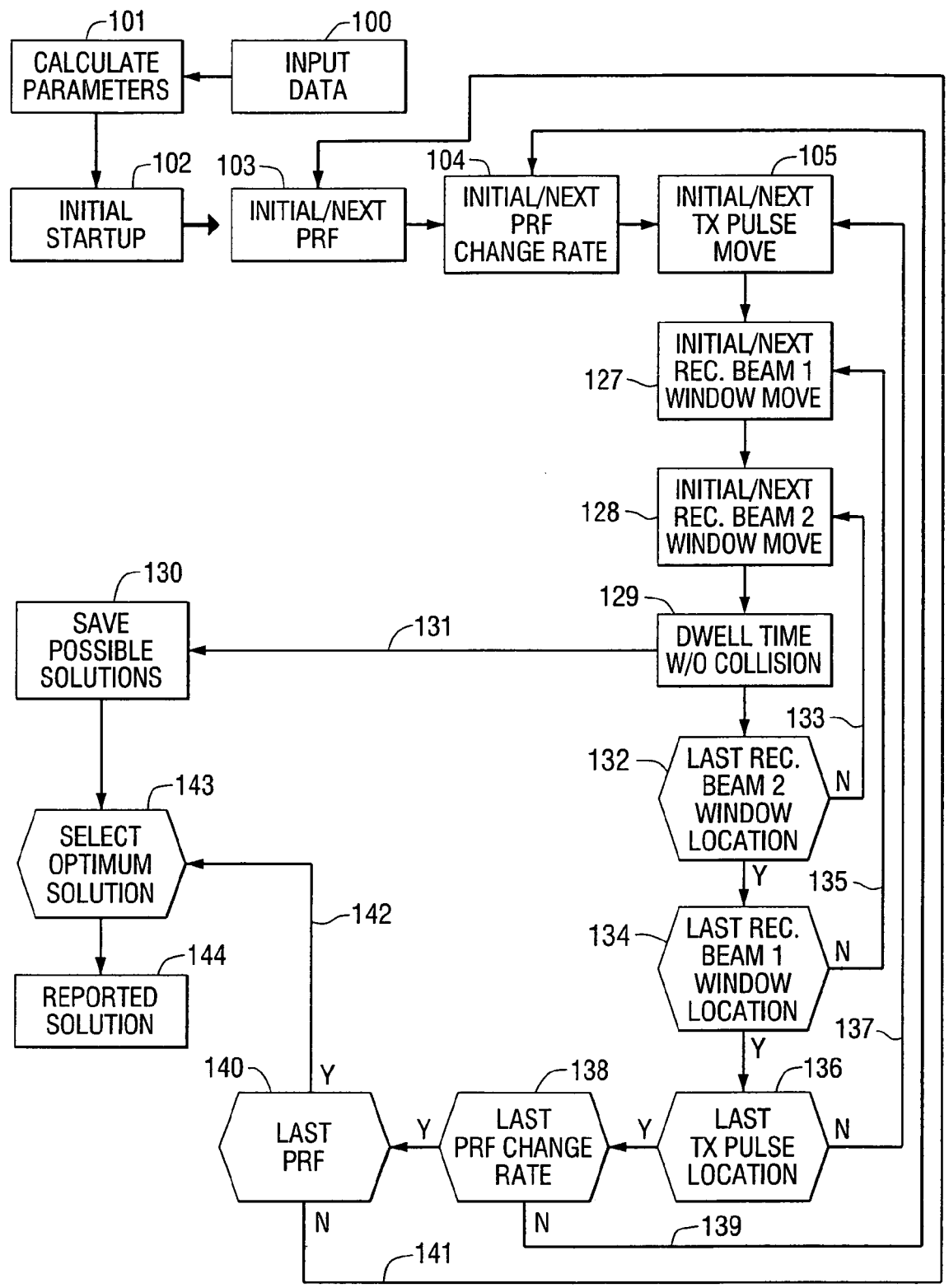
FIG. 7 is a flowchart illustrating the present invention.

The procedure of the present invention is operable to select a proper PRF, PRF change rate and a non-collision transmit pulse and receive window alignment so as to provide sufficient dwell time to accomplish an imaging mission of obtaining target images of a plurality of target areas. An example of such procedure is illustrated in FIG. 7. Although, for simplicity, the example is for a two beam arrangement, the principles apply to any multibeam system.

As seen in FIG. 7, the process begins with the inputting of certain data, as indicated by block 100. These data relate to the mission to be flown as well as data related to the radar. Such data may include the following:

Quantity of beams: —This is the number of beams to be used in the mission.

Geographic location of each target area to be imaged: —These are given in certain ground range coordinates.

Resolution of each collect: —This is defined by the bandwidth of the transmit signal and applies to both range and azimuth.

Duty cycle of each beam: —This is the percentage of the IPP that the transmit pulse occupies. It will be different for different particular modes of operation used.

Range and azimuth swath size to collect: —The target area is in the general shape of an oval having a major axis (range) and a minor axis (azimuth). The receive portion of the hardware can be operated to collect the entire area irradiated by the transmit beam or only a portion of it.

Platform altitude: —Altitude can be preset or may be provided by an onboard navigation system.

Range and Doppler ambiguities: —As previously explained, range ambiguity is associated with the major axis of the target area ellipse, while Doppler ambiguity is associated with the minor axis, or azimuth. The general area of collection at the −3 dB power points on the target area is expanded to, for example, −20 dB to ensure that the sampling rate is compatible with the frequency content of the return so as to avoid aliasing, which would degrade the image obtained.

Aperture size: —This is the size of the antenna. For example, it would be the diameter, if the antenna is round, a height and width, if the antenna is rectangular and a major and minor axis, if the antenna is elliptical or quasi-elliptical.

RF frequency: —This is the frequency of the transmitted signal. For example, if an FM chirp (FIG. 5B) is used, the center frequency would be designated.

These data are provided to block 101 where certain parameters are calculated. Such calculated parameters may include:

Azimuth, elevation and graze angle: —These may be determined from the relationship between the platform and the geographic location of each target area to be collected.

Platform velocity: —For an aircraft this value is set by the mission requirements. For a satellite the velocity may be determined by a knowledge of its altitude.

Line of sight (LOS) range, range rates and acceleration: —These are determined from geographic considerations of platform location relative to the target area and how that relation changes as the platform flies along its prescribed path.

Pulse width: —This is calculated from the known duty cycle.

Unambiguous range and Doppler limited PRFs: —This is computed based on range and Doppler ambiguity as well as the swath size to be collected.

Selection of PRF limits: —The range distance of the target area determines the maximum PRF rate at which sampling may be done. If the sampling rate is higher ambiguities will be introduced. The minimum PRF rate is determined by the azimuth dimension of the target area and chosen to avoid Doppler aliasing.

Maximum dwell time needed to obtain target image: —Knowing the flight path and its relationship to the target area, the dwell time needed may be calculated.

Coherent integration time: —This relates to the dwell time needed for each beam of the multibeam arrangement.

PRF change rate: —As the platform flies its prescribed path, the range rate is changing therefore the PRF rate must change. The rate at which the PRF changes is estimated, based on geographic considerations. In addition, for an airborne platform the rate change would be much faster than for a satellite platform. Once a family of rate changes is estimated, it will apply to all beams.

Initial startup block 102 provides all related calculated parameters for the iterative process, including PRFs, PRF change rates and initial transmit pulse and receive window alignment. Blocks 103 and 104 receive the calculated PRF range and PRF change rates, and block 105 receives the transmit pulse alignment, respectively.

Figure 8:
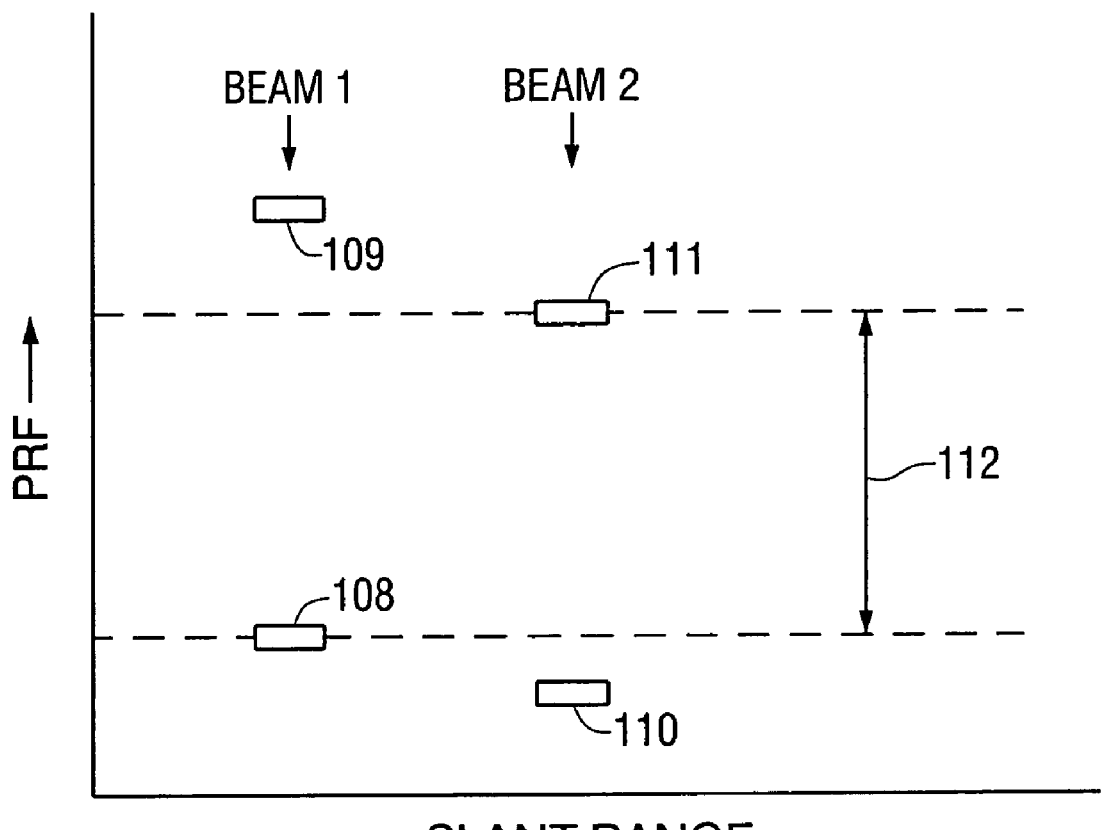
FIG. 8 is a diagram related to the selection of PRFs.

The selection of PRFs to be utilized may be understood with additional reference to FIG. 8, where PRF is plotted on the vertical axis and slant range is plotted on the horizontal axis, for a two beam system, by way of example. A minimum PRF 108 for beam 1 is plotted, as is a maximum PRF 109. A similar calculation yields a minimum PRF 110 for beam 2 as well as a maximum PRF 111. To satisfy both conditions, the higher of the two minimum PRFs is selected as a starting PRF range and the lower of the two maximums is selected as the termination of the PRF range. That is, the PRFs to be tested are in the range designated by numeral 112.

Figure 9:
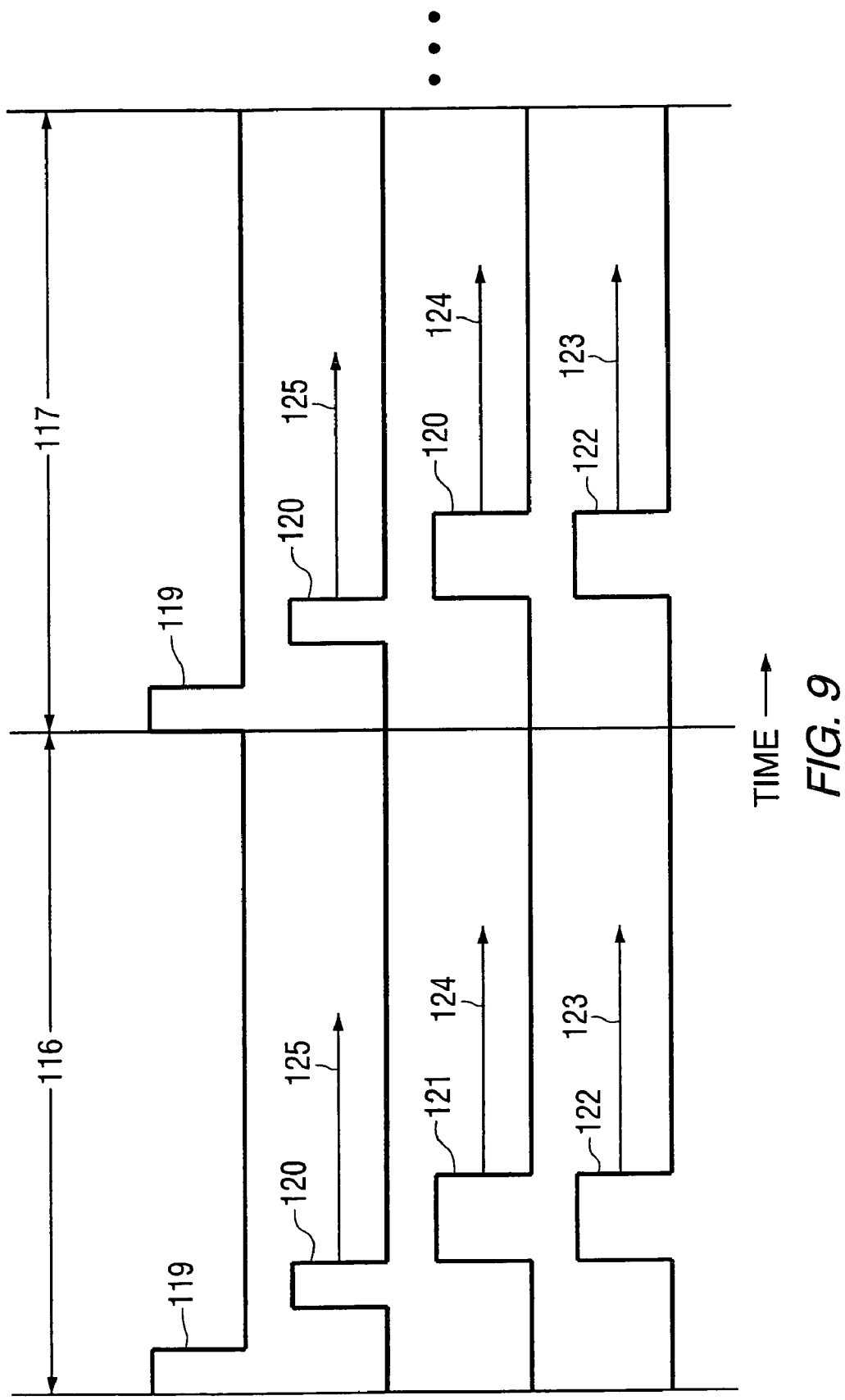
FIG. 9 illustrates an operation performed within the flowchart of FIG. 7.

The iterative process to be described may best be understood with reference to FIG. 9. In FIG. 9, two IPPs, 116 and 117, out of a series of IPPs are illustrated. Each IPP includes a transmit pulse 119 for beam 1, a transmit pulse 120 for beam 2, a receive window 121 for beam 1 and a receive window 122 for beam 2, each being positioned in an initial starting position as illustrated. The transmit pulses 119 and 120 are preferably linear FM chirps for higher bandwidth and resolution. Although a single pulse is illustrated, each transmit may be constituted by a step chirp as in FIGS. 5D and 5E, in which case the number of receive windows for each transmit would be commensurate with the number of transmit pulses.

To commence the iterative process, receive window 122 of beam 2 is moved in incremental steps, as indicated by arrow 123. For each new location of the receive window 122, the arrangement is tested for a non-collision alignment. When receive window 122 reaches the end of the IPP 116, it is returned to its initial starting position whereupon receive window 121 for beam 1 is incremented by one step in the direction of arrow 124. After this one step increment, receive window 122 is incrementally stepped until it reaches the end of the IPP, as before. It is then returned and receive window 121 is incremented one more step and the process repeated with receive window 122.

After receive window 121 has reached the end of the IPP 116, it is returned to its initial starting position and transmit pulse 120 for beam 2 is incremented one step in the direction of arrow 125, and the preceding process is repeated. When transmit pulse 120 reaches the end of the IPP 116, it is returned to its initial starting position. At this point the next PRF and PRF change rate is tested.

For example, let it be assumed that the PRFs to be tested range from 1000 Hz to 2000 Hz and five PRF change rates have been determined, ranging from 1b Hz to 5b Hz, where b may be a small fraction of a Hertz. After IPP 116 has been tested, the next IPP 117 is similarly tested with a new PRF of 1000 Hz+b Hz. The next IPP will be tested with a new PRF of 1000+2b Hz whereupon the process continues until the last PRF change rate 5b Hz is employed. The next PRF of 1001 is then selected and the entire preceding process is repeated for that IPP, as well as for all subsequent IPPs. Since the PRF is increasing for each subsequent IPP, each IPP will be of slightly shorter duration than a previous IPP.

During the entire preceding process the alignment of transmit pulses and receive windows is tested for a non-collision alignment. When a non-collision alignment is detected, the flight of the platform is simulated using the PRF, the PRF change rate and transmit pulse and receive window alignment which resulted in the non-collision.

The flight is simulated by applying the particular PRF and adding the PRF rate change for each simulated transmission in the flight. For example, suppose one of the non-collision alignments occurs with a PRF of 1005 Hz with a PRF change rate of 2b Hz. After the first transmission at 1005 Hz, the next and subsequent transmissions will add 2b Hz for each transmission until a collision occurs.

During the simulation, the dwell time until a collision occurs is recorded and a PRF, PRF change rate and transmit pulse and receive window alignment which provides sufficient dwell time to accomplish the desired mission is saved for use in an actual flight of the platform.

During the test for sufficient dwell time, two options are possible. A first option tests every possible combination and stores all calculated dwell times, while a second option stops the process after a sufficient dwell time is calculated for a particular arrangement. In the latter case, that particular arrangement is used in the actual flight of the platform.

Returning once again to FIG. 7, block 127 initializes the receive window for beam 1 (receive window 121 FIG. 9) and causes the stepping action in the direction of arrow 124. The next block 128 initializes the receive window for beam 2 (receive window 122) and causes the stepping action in the direction of arrow 123.

Block 129 serves to test each alignment to see if there is a non-collision. If there is a non-collision it will use that alignment and the particular PRF and PRF change rate to simulate a flight of the platform over its prescribed course to determine the dwell time until a collision does occur. If the calculated dwell time is sufficient to accomplish a mission, that dwell time will be stored in block 130 via path 131.

Basically, block 129 tests for non-collision and simulates the motion of the platform thereby creating the geometry changes that would exist in the real case. The processing also determines whether the solution will remain valid for the required time to obtain images of all the target areas.

After the test for non-collision, block 132 determines if the receive window for beam 2 has reached the end of the IPP. If not, then path 133 causes the indexing of that receive window by one step by its connection to block 128. If the receive window for beam 2 has reached the end of the IPP, then block 134 determines if the receive window for beam 1 has reached the end of the IPP. If not, then path 135 causes the indexing of that receive window by one step by its connection to block 127.

If the receive window for beam 1 has reached the end of the IPP, then block 136 determines if the last transmit pulse has reached the end of the IPP. In this example of a two beam system, the last transmit pulse is transmit pulse 120, since the first transmit pulse 119 is not involved in the moving process. If the transmit pulse has not reached the end of the IPP, then it is indexed by one step by virtue of the connection via path 137 to block 105. If the transmit pulse has reached the end of the IPP, then block 138 determines if the last PRF change rate has been made. If not, path 139 causes the selection of the next PRF change rate by its connection to block 104.

If the last PRF change rate has been utilized the process checks to see if the last PRF has been utilized, as indicated by block 140. If more PRFs are to be tested, line 141 selects the next PRF from block 103. If the last PRF has been tested path 142 causes the selection of the optimum solution, in block 143. The optimum solution is one where a particular PRF, PRF change rate and alignment of transmit pulses and receive windows allow a flight with sufficient dwell time to capture the desired images. This arrangement is then reported in block 144 for use in the actual flight of the platform.

Figure 10:
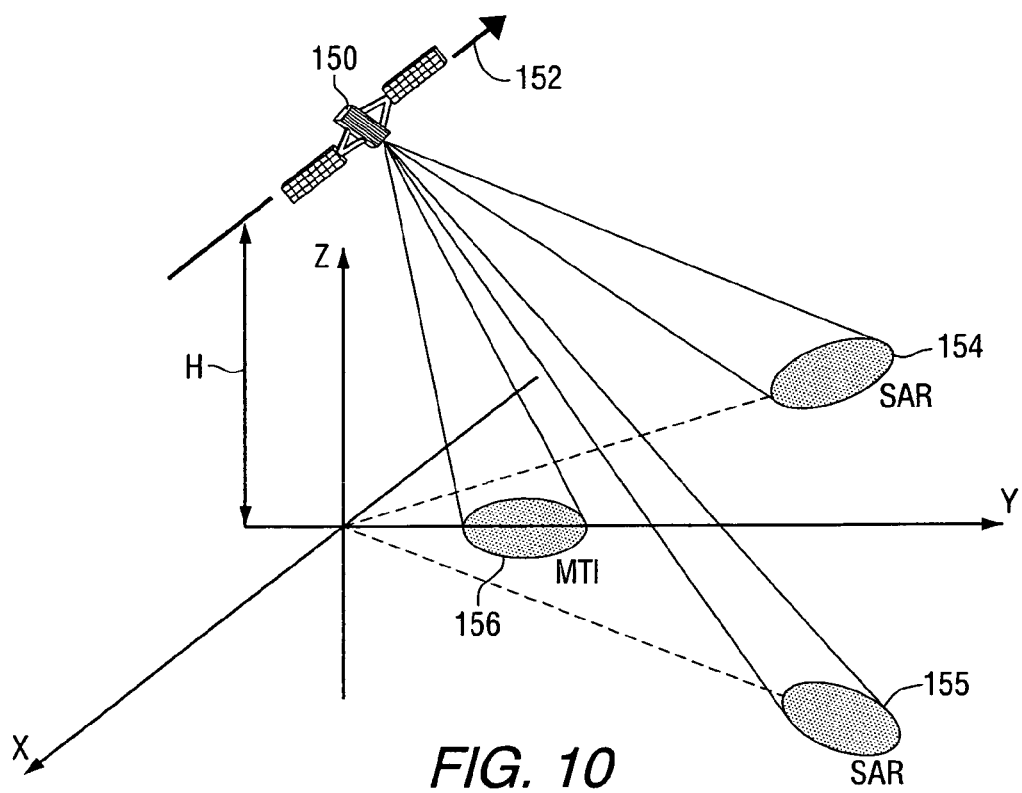
FIG. 10 illustrates a satellite borne radar producing three beams.

FIGS. 6A and 6B and FIGS. 7 to 9 describe operation with two beams, FIG. 10 illustrates a scenario utilizing three beams with a satellite borne radar. FIG. 10 illustrates a satellite 150 in an XYZ coordinate system flying at an altitude of H above the surface of the earth. By way of example, two of the beams are SAR beams for examining respective target areas 154 and 155, while the third beam is an MTI beam examining target area 156.

Figure 11:
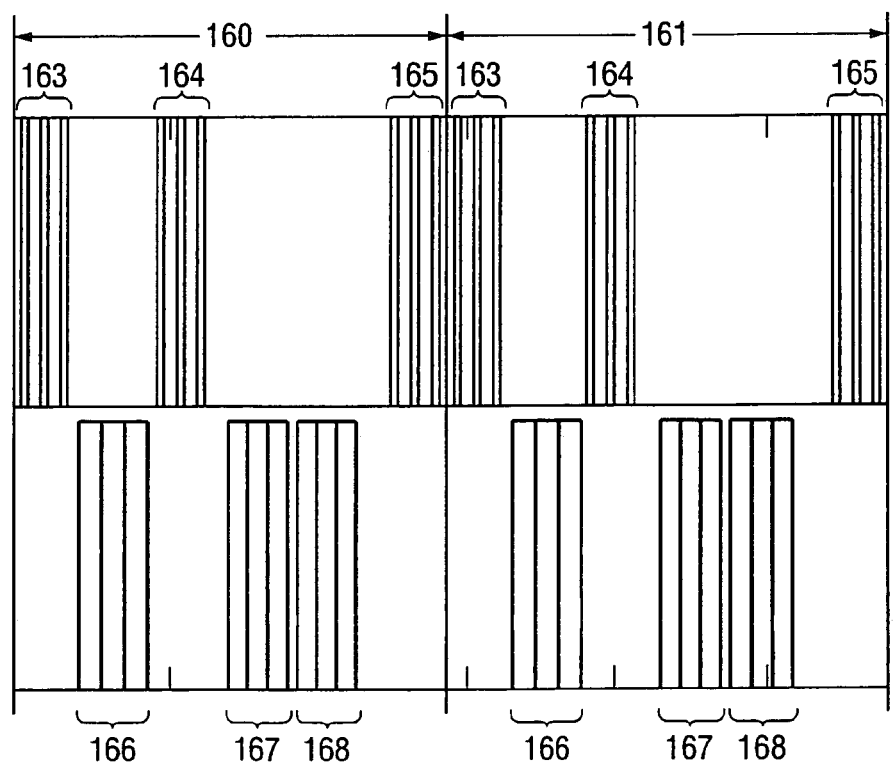
FIG. 11 is a timing diagram related to the arrangement of FIG. 10.

Due to the extreme altitude H typical for a satellite the range to each target area is such that target returns are received many IPPs later than the IPPs in which the beams were transmitted. FIG. 11 illustrates a typical scenario. A transmit consists of three step chirps, by way of example. The time period shown illustrates two IPPs 160 and 161. Each of the IPPs includes a three step transmit chirp 163 for irradiating SAR target area 154 (FIG. 10), a three step transmit chirp 164 for irradiating MTI target area 156 and three step transmit chirp 165 for irradiating SAR target area 155.

Each IPP includes three receive windows for each three step transmit chirp. More particularly, the IPPs include a three receive window arrangement 166 which receives returns from SAR target area 156, a three receive window arrangement 167 which receives returns from SAR target area 154 and a three receive window arrangement 168 which receives returns from MTI target area 155. The returns are the result of transmissions from previous IPPs and their IPP location is a function of the respective distances to the target areas.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A method of operating a multibeam radar carried on a platform flying a mission over a prescribed flight path to obtain images of a plurality of target areas, the beams of said radar being the result of respective transmit pulses and beam returns being received by respective receive windows, comprising the steps of:
   providing a plurality of data relating to said mission and said radar;
   from said data, calculating a plurality of parameters related to the geometry of the flight of said platform as well as the operation of said radar, including the calculation of a range of PRFs and PRF change rates to be utilized in an iterative process;
   performing said iterative process to determine a non-collision alignment of said transmit pulses and said receive windows;
   utilizing said PRFs, PRF change rates and said non-collision alignment to simulate a flight of said platform over said prescribed path to determine, for said alignment the dwell time until a collision occurs;
   utilizing in an actual said mission said PRF, PRF change rate and said non-collision alignment which provided sufficient said dwell time to obtain all said images.

2. A method according to claim 1 wherein an IPP includes a plurality of transmit pulses and receive windows, each in a respective starting position, and wherein said iterative process includes the steps of:
   moving the last of said receive windows from its starting position to the end of said IPP in incremental steps;
   returning said last of said receive windows to its starting position;
   incrementing the next previous receive window by one incremental step and repeating said moving process of said last of said receive windows;
   each time said last of said receive windows returns to its starting position, incrementing said next previous receive window by one incremental step until it reaches the end of said IPP, after which it is returned to its starting position;
   repeating the above process with any other receive windows, if present;
   after the above process, incrementally moving a last of said transmit pulses by one incremental step and repeating the above process with said receive windows;
   after the last of said transmit pulses has been incremented to the end of said IPP, returning it to its starting position;
   if there are other transmit pulses, other than the first transmit pulse, then repeating the above process with the moving of those other transmit pulses;
   during said movement of said receive windows and said transmit pulses, checking for a non-collision alignment with each said incremental movement.

3. A method according to claim 1 wherein said calculation of a range of PRFs includes the steps of:
   establishing for each said beam utilized a minimum PRF and a maximum PRF;
   selecting the highest of said minimum PRFs as a minimum PRF to be used in said iterative process; and
   selecting the lowest of said maximum PRFs as a maximum PRF to be used in said iterative process.

4. A method according to claim 1 which includes the step of:
   after a sufficient dwell time has been established for a particular PRF, PRF change rate and non-collision alignment, terminating said iterative process and utilizing said PRF, PRF change rate and noncollision alignment which resulted in said sufficient dwell time, in said actual mission.

5. A method according to claim 1 which includes the step of:
   completing said iterative process to establish all said dwell times; and
   selecting a PRF, PRF change rate and non-collision alignment which provides sufficient dwell time to accomplish a said mission and using them in an actual mission.

6. A method according to claim 1 wherein said data include:
   the number of beams to be formed.

7. A method according to claim 1 wherein said data include:
   the geographic location of each target area to be imaged.

8. A method according to claim 1 wherein said data include:
   the range and azimuth resolution desired.

9. A method according to claim 1 wherein said data include:
   the duty cycle of each beam.

10. A method according to claim 1 wherein said data include:
    the range and azimuth swath size to collect.

11. A method according to claim 1 wherein said data include:
the altitude of the platform.

12. A method according to claim 1 wherein said data include:
the range and Doppler ambiguities.

13. A method according to claim 1 wherein said data include:
the size of the radar antenna.

14. A method according to claim 1 wherein said data include:
the RF frequency to be used.

15. A method according to claim 1 wherein said calculated parameters include:
azimuth, elevation and graze angle to the target area.

16. A method according to claim 1 wherein said calculated parameters include:
the velocity of said platform.

17. A method according to claim 1 wherein said calculated parameters include:
the line of sight range to the target areas, range rates and accelerations.

18. A method according to claim 1 wherein said calculated parameters include:
the pulse width of the transit pulses.

19. A method according to claim 1 wherein said calculated parameters include:
unambiguous range and Doppler limited PRFs.

20. A method according to claim 1 wherein said calculated parameters include:
selection of PRF limits to be used in said iterative process.

21. A method according to claim 1 wherein said calculated parameters include:
the maximum dwell time needed to obtain target images.

22. A method according to claim 1 wherein said calculated parameters include:
the coherent integration time for obtaining the dwell time for each beam.

23. A method according to claim 1 wherein said calculated parameters include:
the PRF change rate.

* * * * *